(12) United States Patent
Pegouret et al.

(10) Patent No.: US 6,205,820 B1
(45) Date of Patent: Mar. 27, 2001

(54) PROCESS FOR IMPROVING ADHESIVE ATTACHMENT

(75) Inventors: Jean-Marie M. G. Pegouret, Paris; Frederic H. F. Jean-Marie Florent, Samoreau, both of (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 08/104,866

(22) Filed: Aug. 11, 1993

(30) Foreign Application Priority Data

Sep. 4, 1992 (FR) .................................................. 92 10589

(51) Int. Cl.⁷ .............................. C03C 27/06; G02B 6/26
(52) U.S. Cl. ..................................... 65/406; 65/43; 65/31; 65/60.8; 156/153; 156/293; 156/326; 385/9; 385/99
(58) Field of Search ........................... 385/97, 9, 39, 385/141, 49, 50, 95, 88, 89, 91, 94, 96, 98, 99; 65/4.1, 4.2, 60.8, 4.3, 4.21, 406, 3.1, 31, 3.43, 43; 156/89, 279, 281, 280, 293, 153, 326

(56) References Cited

U.S. PATENT DOCUMENTS

| | | | |
|---|---|---|---|
| 3,341,399 | 9/1967 | Hazdra | 161/195 |
| 3,702,783 | 11/1972 | Hartlein | 117/126 |
| 4,019,805 * | 4/1977 | Marcahli et al. | 385/88 |
| 4,045,668 * | 8/1977 | Pitt et al. | 350/96 R |
| 4,061,486 * | 12/1977 | Jahn | 65/18 |
| 4,130,343 * | 12/1978 | Miller et al. | 350/96.15 |
| 4,227,950 | 10/1980 | Spycher | 156/85 |
| 4,380,365 * | 4/1983 | Gross | 350/96.18 |
| 4,391,621 * | 7/1983 | Siegmund | 65/31 |
| 4,475,935 * | 10/1984 | Tanaka et al. | 65/3.41 |
| 4,679,918 | 7/1987 | Ace | 351/163 |
| 4,683,153 | 7/1987 | Goepfert et al. | 428/1 |
| 4,683,168 | 7/1987 | Hares | 428/335 |
| 4,746,189 * | 5/1988 | Arrington et al. | 350/96.21 |
| 4,767,430 * | 8/1988 | Deneka et al. | 65/4.2 |
| 4,784,452 * | 11/1988 | Hodge et al. | 350/96.16 |
| 4,793,703 | 12/1988 | Fretz, Jr. | 351/163 |
| 4,875,969 * | 10/1989 | Hsu et al. | 156/633 |
| 4,930,859 * | 6/1990 | Hoffman, III | 350/96.21 |
| 4,931,076 | 6/1990 | Berkey | 65/4.2 |
| 4,943,130 | 7/1990 | Dannoux et al. | 6/12 |
| 4,948,407 * | 8/1990 | Bindell et al. | 65/3.14 |
| 4,954,152 * | 9/1990 | Hsu et al. | 65/3.1 |
| 4,959,515 * | 9/1990 | Zavracky . | |
| 4,976,506 * | 12/1990 | Pavlath | 350/96.2 |
| 4,977,028 | 12/1990 | Goepfert et al. | 428/426 |
| 4,979,970 * | 12/1990 | Dannoux et al. | 65/2 |
| 5,004,869 * | 4/1991 | Koblitz et al. | 174/84 C |
| 5,009,692 | 4/1991 | Miller | 65/3.1 P |
| 5,011,251 | 4/1991 | Miller et al. | 350/96.15 |
| 5,015,059 * | 5/1991 | Booth et al. | 350/96.17 |
| 5,028,395 * | 7/1991 | Sebille et al. | 422/82.06 |
| 5,091,053 | 2/1992 | Blonder et al. | 156/657 |
| 5,146,531 * | 9/1992 | Shustack | 385/128 |
| 5,160,523 * | 11/1992 | Honkanen et al. | 65/30.13 |
| 5,219,896 * | 6/1993 | Coady et al. | 522/96 |
| 5,246,782 * | 9/1993 | Kennedy et al. | 428/421 |
| 5,266,352 * | 11/1993 | Filas et al. | 427/163 |
| 5,307,438 * | 4/1994 | Bilkadi et al. | 385/141 |
| 5,354,825 * | 10/1994 | Klainer et al. | 526/268 |
| 5,450,513 * | 9/1995 | Bookbinder | 385/48 |

FOREIGN PATENT DOCUMENTS

| | | | |
|---|---|---|---|
| 3735886 * | 5/1989 | (DE) | 385/97 |
| 0470819 * | 12/1992 | (EP) . | |
| 2 612 301 | 3/1987 | (FR) . | |

OTHER PUBLICATIONS

Ceramic Abstracts 54 9/10, Oct. 9, 1975, I.V. Pisch "Chemical Polishing of Cut Glass".

* cited by examiner

*Primary Examiner*—James Derrington
(74) *Attorney, Agent, or Firm*—K. McNeill Taylor, Jr.; William J. Simmons, Jr.; William J. Chervenak

(57) ABSTRACT

The invention relates to a process for treating a machined glass surface for improving the adhesive attachment of an optical fiber to this surface, characterized in that machined surface is attacked by an aqueous solution of hydrofluoric acid, then the attacked surface is treated with a bifunctional hydrolyzable silane adhesion promoter or the product of its hydrolysis and partial condensation.

5 Claims, No Drawings

PROCESS FOR IMPROVING ADHESIVE ATTACHMENT

BACKGROUND OF THE INVENTION

The invention relates to a process for improving the attachment with an adhesive of optical fibers to a glass substrate, and also to an integrated optical component treated by this process.

Integrated optical components such as couplers to which optical fibers are glued, are known (for example in FR-A-2 612 301, which corresponds to U.S. Pat. No. 4,943,130, or in the application for the French patent 92 07490 filed Jun. 19, 1992 which corresponds to U.S. Ser. No. 08/075,124 filed Jun. 10, 1993). Most of the time optical fibers must be glued to a surface of the component which has been produced by mechanical or other machining (sawing) of a slice or small sheet of glass.

It turned out that the adhesive attachment between the fibers and the machined surface on which they are glued is very often defective.

The Applicant, who has carried out extensive research to solve this problem, has found that the defective attachment which was observed could be the result of one or more of the following causes:

fragility of the glass surface resulting from the machining process (porosity, fissures, loosely fixed fragments);

the presence of organic or other stains on the machined surface;

the existence of an elevated degree of unstabilized ions of alkali metals in the surface layer of the machined glass, which could result from a previous ion-exchange process, optionally under the action of an electric field;

the use of a glass with a relatively low silica content (<55% in weight), which can be altered by humidity.

Therefore, there is a need for a treatment of a machined glass surface which improves the adhesive attachment of optical fibers to this surface.

The invention precisely aims to provide such a treatment.

The invention relates to a process for treating a machined glass surface, for improving the attachment of an optical fiber to this surface with an adhesive, characterized in that the machined surface is attacked by an aqueous solution of hydrofluoric acid; then the attacked surface is treated with a bifunctional hydrolyzable silane adhesion promoter or the product of its hydrolysis and partial condensation.

We surprisingly found that the inventive treatment improved the adhesive bond to a much greater extent than could be expected from the improvements obtained with separate treatments—that is by a solution of hydrofluoric acid alone or by a silane treatment alone.

The invention is especially useful for treating glasses with a $SiO_2$ content below 55% in weight which are particularly sensitive to the effects of humidity at a moderately elevated temperature (60–65° C.).

As an aqueous solution of hydrofluoric acid, a diluted solution as well as a concentrated solution can be used. The speed of the attack will simply be increased according to the concentration of the solution, and therefore the duration of the attack will have to be adjusted accordingly.

Also, the attack will be more rapid if the temperature is elevated. Finally, an ultrasonic stirring of the attack bath will increase even more the speed of attack.

We have found that the attack conditions (concentration, stirring, duration, temperature) leading to the removal of a layer of glass of 3 to 5 µm are usually satisfactory. After such an attack, one usually observes the disappearance, on the machined surface, of the scratches and roughness due to mechanical sawing, and the formation of a surface with a globular and more polished aspect. However, a more significant attack can be carried out without drawback provided that it is taken into account in the component dimensions. Nevertheless, such a significant attack does not seem to provide additional advantage.

Besides the hydrofluoric acid, the attacking solution may contain an auxiliary acid such as sulfuric or acetic acid. The effect of such an acid is to accelerate the attack. A buffer agent, such as $NH_4F$, could also be present in the solution, if desired.

The hydrofluoric attack must be preceded by a careful cleaning of the surface to be attacked, for example by an ultrasonic wash with a diluted detergent solution, by an ultrasonic wash with an organic solvent such as acetone, and by an alcohol rinse with intermediate and final nitrogen blowing.

The careful cleaning of the surface to be attacked may include an ultrasonic wash using a detergent solution of M9 powder, in concentration of 15–25 grams/liter, and M9 additive in concentration of 15–25 ml/l, at a temperature of 60° C. for three (3) minutes, followed by three (3) rinses with water at 8 MΩ to 10 MΩ resistivity (i.e., high purity grade water) with and without ultrasonic vibration. M9 powder is a phosphate detergent with pH buffered at 8.6 to prevent glass from corrosion in alkaline media. M9 additive is a non-ionic surface active agent. Both M9 powder and M9 additive were purchased from FISA, ZAC des Gâtines, 4 avenue du Garigliano, 91601 Saviguy sur Orge Cedex, France.

After the hydrofluoric attack, the surface is carefully rinsed with water for example, using a process similar to the rinses incorporated in the careful cleaning, and dried, for example, by heating at 105° C. for approximately 60 minutes followed by cooling at room temperature for about 10 minutes, and then it is subjected to a silane treatment. This treatment is carried out with a solution of bifunctional hydrolyzable adhesion promoter or the product of its hydrolysis and partial condensation. The glass adhesion promoters are well known. The most common ones are glycidoxyalkyltrialcoxysilanes, such as glycidoxypropyltrimethoxysilane, or aminoalkyltrialcoxysilanes, such as gamma aminopropyltriethoxysilane. These agents are usually used in the form of a diluted alcoholic aqueous solution containing from 0.1 to 10% in weight of silane—preferably from 0.5 to 2% in weight, though these proportions are not critical—.

The following non-limiting examples are given in order to illustrate the invention.

EXAMPLE 1

Four glass couplers having a machined surface for the gluing of optical fibers, formed of a glass composed, in weight % of 47.8% $SiO_2$, 17.4% $B_2O_3$, 14.6% $Al_2O_3$, 12.4% $K_2O$, 2.2% $Na_2O$ and 5.6% F have been carefully washed, then plunged for 4 seconds at 20° C., without any stirring, into a bath of 23M hydrofluoric acid solution (commercial solution at 40%), and then rinsed with demineralized water in two successive baths, and finally dried with nitrogen blowing.

The resulting dry couplers have been treated in a silane bath, composed in weight % of 1% of A187 silane (glycidoxypropyltrimethoxysilane) sold by UNION CARBIDE, 1 wt. % water and 98 wt. % ethanol, that has been previously aged under stirring for 24 hours in order to produce the silane hydrolysis and partial condensation. The duration of the immersion of the couplers in the bath, without stirring, lasted 2 minutes. Then, the couplers have been dried with nitrogen, and placed in an oven at 105° C. for 1 hour to complete the silane condensation.

Eight optical fibers have been glued to each of the ultimately obtained couplers with a photopolymerisable acrylate adhesive Luxtrak® LCR 050V from the ICI Corporation.

The couplers with the glued optical fibers have been subjected to a humidity resistance test. This test consisted of maintaining the samples at 60° C. and 93% relative humidity for 18 days, then at 65° C. and 93% relative humidity for 8 days.

At the end of the test, the fiber attachment areas have been observed through a microscope, and the fibers under which the onset of detachment between glass and adhesive (presence of an air strip) was visible have been counted.

For comparison purposes, the following samples have also been prepared:
  4 samples with no preliminary treatment (except the initial cleaning),
  4 samples treated only with hydrofluoric solution,
  4 samples treated only with silane.

The obtained results are summarized in the following table:

|  | Without HF Treatment | | With HF Treatment | |
| --- | --- | --- | --- | --- |
| Treatment | Without Silane | With Silane | Without Silane | With Silane |
| # of Detachments /32 | 20 | 15 | 24 | 0 |
| % of Detachment | 63 | 47 | 75 | 0 |

These results show, surprisingly, that:
1) without HF treatment, an attachment to a silanised glass has a better humidity resistance than an attachment to a non-silanised glass, but the resulting advantage is insufficient to be satisfactory from an industrial standpoint;
2) the HF treatment alone doesn't improve the humidity resistance of the attachment rather the treatment deteriorates the resistance in comparison with the absence of any treatment;
3) the HF treatment followed by the silane treatment produces a synergistic effect that results in an exceptional humidity resistance for the attachment.

EXAMPLES 2 to 4

The highly concentrated solution used in the example #1 presents the following drawback: the glass is attacked so quickly that the attack duration must be controlled with precision, a 1 or 2 seconds error being capable of making the attack depth vary 1 $\mu$m or more. As the optical fibers must be very precisely positioned on the coupler, it may be difficult to control the use of such a concentrated solution on an industrial scale.

Therefore, attack bath compositions and attack conditions producing a slower attack while allowing a 3 to 5 micrometers glass elimination in 1 to 2 minutes are suggested below.

| Example | HF, mole/l | $H_2SO_4$ mole/l | ° C. | stirring |
| --- | --- | --- | --- | --- |
| 2 | 0.6 | — | 20 | none |
| 3 | 0.46 | 0.23 | 25 | none |
| 4 | 0.46 | — | 25 | none |

EXAMPLE 5

This example illustrates the effect of the temperature on the attack speed.

The composition of the attack bath used is the one of example 3, and 3 sample-couplers have been subjected to an attack of 2 minutes in this bath, without any stirring, and at temperatures of 20, 25 and 30° C., respectively.

The thickness of eliminated glass on the machined part of each couplers was, respectively, 1.7, 2.8 and 3.7 $\mu$m.

This example shows that the temperature plays an important role, and that it must be precisely controlled to obtain reproducible results.

EXAMPLE 6

This example illustrates the effect of ultrasonic vibration on the speed of the attack.

The composition of the attack bath used is the one of example 3, and sample-couplers have been subjected to an attack in this bath at 25° C. for 2 min, with and without ultrasonic agitation. The attack depths on the machined surface of the couplers have been 4.9 and 2.8 $\mu$m respectively.

Thus, ultrasonic vibration increases the attack speed to a great extent.

Needless to say, the described embodiments are merely examples, they can be modified—in particular by substituting technical equivalents—without thereby departing from the scope of the invention.

What is claimed is:

1. A process for attaching an optical fiber to a glass integrated optical component comprising the steps of
  machining a region of said component to expose a machined glass surface,
  subjecting said machined surface to attack by an acid solution,
  treating said surface with a silane adhesion promoter, and
  gluing an optical fiber to the treated surface.
2. The process of claim 1, wherein the step of subjecting said surface to attack is continued until the thickness of eliminated glass is 3 to 5 $\mu$m.
3. The process of claim 1, wherein said process is carried out on the machined surface of a glass with a $SiO_2$ content below 55 weight %.
4. The process of claim 1, wherein said integrated optical component is a coupler.
5. The process of claim 4 wherein the glass of which said integrated optical component is comprised contains less than 55 weight % $SiO_2$, and wherein the step of subjecting said surface to attack is continued until the thickness of eliminated glass is 3 to 5 $\mu$m.

* * * * *